United States Patent
Nau et al.

(10) Patent No.: US 6,874,530 B2
(45) Date of Patent: Apr. 5, 2005

(54) DOSING UNIT AND METHOD FOR DOSING LIQUID OR GASEOUS EDUCTS FOR A FUEL CELL SYSTEM

(75) Inventors: Michael Nau, Dornhan/Alschfeld (DE); Nikolaus Benninger, Vaihingen (DE); Marc Bareis, Markgroeningen (DE); Frank Ilgner, Karlsruhe (DE); Horst Harndorf, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 10/181,484

(22) PCT Filed: Jan. 17, 2001

(86) PCT No.: PCT/DE01/00167
§ 371 (c)(1),
(2), (4) Date: Oct. 15, 2002

(87) PCT Pub. No.: WO01/54215
PCT Pub. Date: Jul. 26, 2001

(65) Prior Publication Data
US 2003/0089401 A1 May 15, 2003

(30) Foreign Application Priority Data
Jan. 19, 2000 (DE) .......................................... 100 02 001

(51) Int. Cl.[7] ................................................. G05D 9/12
(52) U.S. Cl. ....................................... 137/503; 137/554
(58) Field of Search ................................. 137/503, 554

(56) References Cited
U.S. PATENT DOCUMENTS

| 3,179,500 | A | | 4/1965 | Bowen |
| 4,250,914 | A | * | 2/1981 | Ferrentino .................... 137/501 |
| 4,809,746 | A | * | 3/1989 | Wolfges ........................ 137/501 |
| 5,076,321 | A | * | 12/1991 | Terry ............................ 137/460 |
| 5,143,116 | A | * | 9/1992 | Skoglund ..................... 137/487 |
| 5,280,804 | A | * | 1/1994 | Takashima et al. .......... 137/501 |
| 5,638,861 | A | * | 6/1997 | Hashida ....................... 137/501 |
| 5,641,532 | A | | 6/1997 | Pflaumer et al. |
| 5,766,786 | A | | 6/1998 | Fleck et al. |
| 5,941,267 | A | * | 8/1999 | DeLand et al. .............. 137/501 |
| 6,253,734 | B1 | | 7/2001 | Rembold et al. |

FOREIGN PATENT DOCUMENTS

| BE | 881 529 | 5/1980 |
| DE | 26 00 572 | 7/1977 |
| DE | 41 18 600 A1 | 12/1992 |
| DE | 44 25 634 C1 | 10/1995 |
| DE | 197 32 117 A | 1/1998 |
| DE | 198 34 120 | 2/2000 |
| FR | 1 532 246 A | 7/1968 |
| GB | 1 114 489 A | 5/1968 |
| GB | 1 447 835 A | 9/1976 |
| WO | WO 99/30380 | 6/1999 |

* cited by examiner

Primary Examiner—Stephen M. Hepperle
(74) Attorney, Agent, or Firm—Ronald E. Greigg

(57) ABSTRACT

A metering unit for metering liquid and/or gaseous educts by means of a feed pump for a fuel cell system, including at least one lead line for delivering an educt flow, at least one control piston, and a differential pressure valve for regulating the educt flow; the differential pressure valve has a regulatable throttling cross section, which is variable automatically, as a function of a flow pressure dictated by the control piston, in order to regulate the educt flow. The lead line leads to the control piston, and between the control piston and the differential pressure valve a first and a second connecting line are provided.

10 Claims, 2 Drawing Sheets

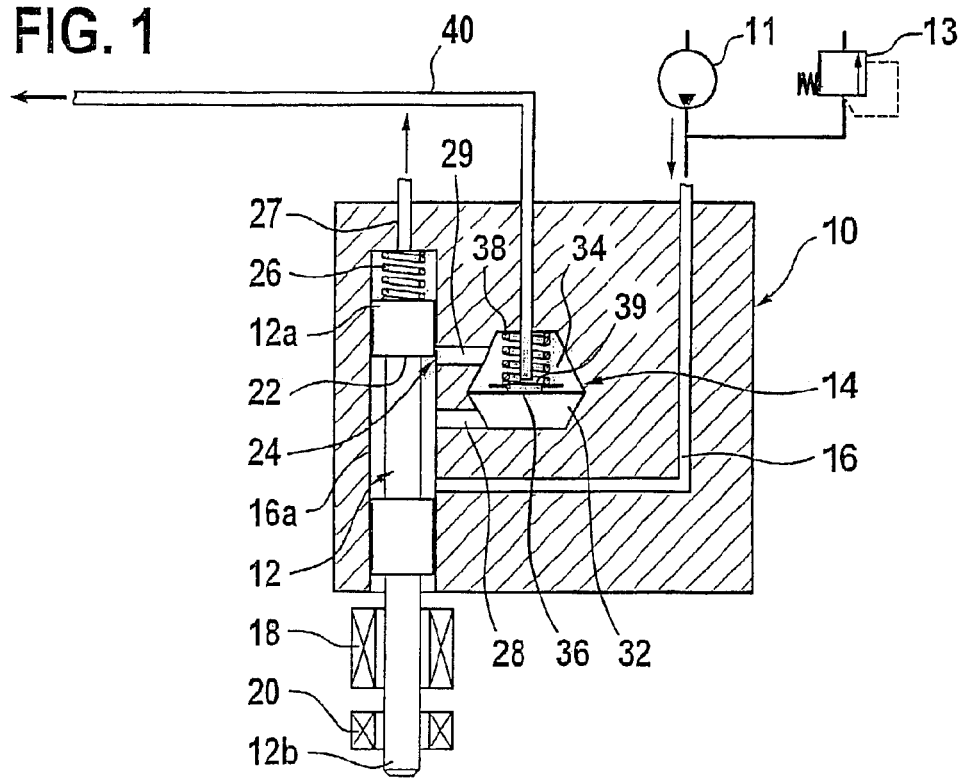
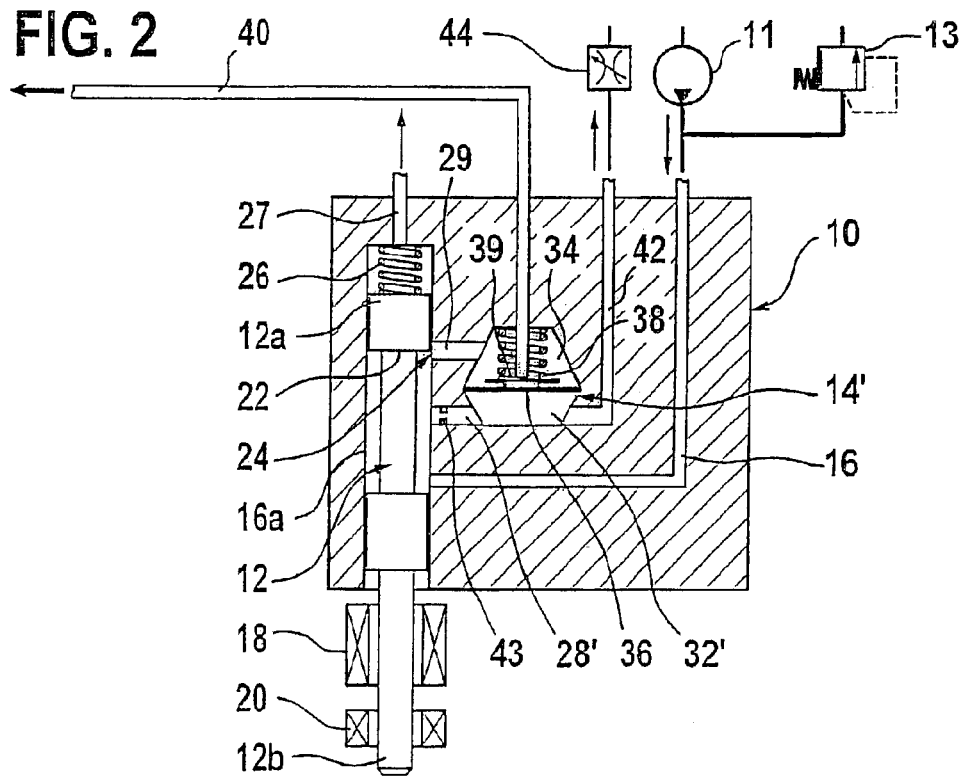

DOSING UNIT AND METHOD FOR DOSING LIQUID OR GASEOUS EDUCTS FOR A FUEL CELL SYSTEM

CROSS-REFERENCE TO RELATED APPLICATIONS

This application is a 35 USC 371 application of PCT/DE 01/00167 filed on Jan. 17, 2001.

BACKGROUND OF THE INVENTION

1. Field of the Invention

The invention relates to a metering unit and a method for metering liquid or gaseous educts for a fuel cell system.

2. Prior Art

Among the alternative drive concepts for motor vehicles, fuel cell-supported systems are gaining increased attention at present. These systems typically contain PEM (polymer electrolyte membrane) fuel cells, which are operated with hydrogen and air as energy vehicles.

Since as before, it still proves problematic to put hydrogen in a tank and store it in the motor vehicle, the hydrogen is produced in an upstream reformer stage, from easily handled fuels such as methanol, methane, Diesel or gasoline, directly "onboard" as needed and is consumed immediately. In such fuel cell systems, many flows of material must accordingly be metered flexibly and nevertheless quite precisely. This is true both for liquid components, such as superpure water, fuels and coolant, and for such gaseous media as air or methane. The primary problem in the metering is that pressure fluctuations in the transport lines make exact metering of the individual components more difficult. These pressure fluctuations can be caused on the one hand by upstream pumps or compressors, but also by the chemical reactions that take place in the reformer, for instance, and can release process gases and thus lead to pressure return shocks.

In German Patent DE 44 25 634 C1, a method and an apparatus for metering liquids for a fuel cell system are described; the metering is done via the cycle time of a magnet valve, and the pressure difference between the feed line and the fuel cell system is regulated via a differential pressure valve. This arrangement, because clocked switching valves are used, creates fluctuations in the volumetric flow in the transport lines, which can cause problems in the chemical reactions that take place in the reactors of the fuel cell system.

In motor vehicles, fuel injection systems are used, which make it possible to meter the fuel at different pressure conditions. These systems, known by the trademark K-Jetronic, contain a combination of a control piston and a differential pressure valve. These are air-pressure-controlled systems, whose use is limited to the metering of fuels.

The object of the present invention is to furnish a metering unit for liquid and gaseous components for a fuel cell system. Pressure fluctuations inside the transport lines are compensated for, and exact metering is made possible.

SUMMARY OF THE INVENTION

The metering unit of the invention and the method have the advantage that even under dynamic load changes, exact metering of liquid and gaseous media is made possible, without requiring a complicated measurement of volumetric flows and corresponding regulation. Since the metering unit of the invention, in contrast to clocked systems, realizes a continuous metering concept, pressure fluctuations in the transport lines of the fuel cell system are successfully averted. This is achieved by the combination of a control piston with a differential pressure valve. Another advantage is that no parts that move at high speed are exposed to such corrosive media as superpure water, and the result is a markedly longer service life for the metering unit.

For the most precise possible metering, it is advantageous if the position of the control piston of the metering unit is determined by means of a travel sensor and can be varied by means of a proportional magnet.

Furthermore, an adaptation of the metering unit to the particular liquid or gaseous media is possible, since in the connecting lines between the control piston and the differential pressure valve of the metering unit, there is a throttle, by which the pressure drop at the metering unit can be adapted.

To make extremely dynamic metering possible, in a further advantageous feature, a drain line with a throttle is provided at the lower valve chamber of the differential pressure valve. This drain line permits a rapid change in the control pressure applied to the differential pressure valve.

It is especially advantageous that for each medium, only one feed pump for furnishing pressure is required, and the metering can be done by means of the metering unit of the invention. This makes it unnecessary to use expensive metering pumps.

BRIEF DESCRIPTION OF THE DRAWINGS

The foregoing and other features and advantages of the invention will become apparent from the description contained below, taken with the drawings, in which:

FIG. 1 shows a schematic illustration of a first exemplary embodiment of the metering unit of the invention;

FIG. 2 shows a schematic illustration of the metering unit of the invention in a second exemplary embodiment.

DESCRIPTION OF THE PREFERRED EMBODIMENTS

Figure 3:
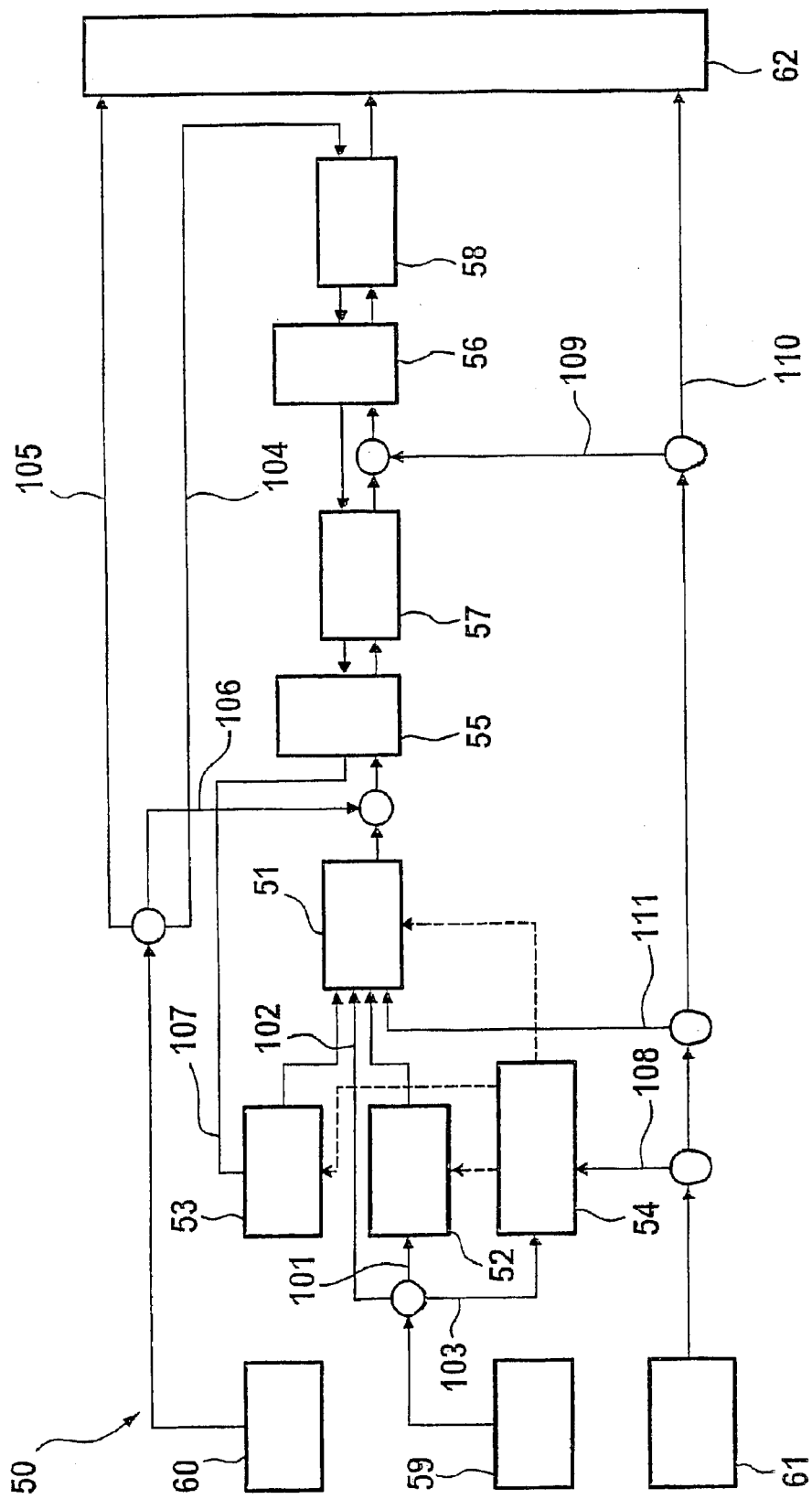
FIG. 3 shows a schematic illustration of a fuel cell system, using the metering unit of the invention.

The metering unit 10 shown in FIG. 1 includes a control piston 12 and a differential pressure valve 14. Upstream from the metering unit 10 is a feed pump 11, for pumping the liquid or gaseous media required in a fuel cell system. A system pressure regulator 13, for instance, can be connected parallel to the feed pump 11 and regulates the system pilot pressure in the lead line 16 that connects the feed pump 11 to the metering unit 10. Inside the metering unit 10, the lead line 16 has a cylindrical piston portion 16a, in which the control piston 12 is guided adjustably, at least in part, by its end 12a toward the lead line. The cylindrical piston portion 16a for instance has a larger cross section than the lead line 16. The control piston 12 has its end 12b toward the housing located outside the cylindrical piston portion 16a. Located on the housing end 12b of the control piston 12 is a proportional magnet 18, for instance, for varying the position of the control piston 12 inside the cylindrical piston portion 16a.

For the sake of the best possible detection of the position of the control piston 12 inside the cylindrical piston portion 16a of the lead line 16, a travel sensor 20 is also disposed on the housing end 12b of the control piston 12.

On its end 12a toward the lead line, the control piston 12 has a control edge 22, whose position, together with the wall of the cylindrical piston portion 16a, dictates a first throttling cross section 24. In the region of the cylindrical piston portion 16a preceding the lead line end 12a of the control piston 12, there is a compression or tension spring 26, for instance, and a vent 27.

The cylindrical piston portion 16a communicates with the differential pressure valve 14 by means of two connecting lines 28, 29. The differential pressure valve 24 in turn has an upper valve chamber 34 and a lower valve chamber 32. The two valve chambers 32, 34 are separated from one another by a flexible diaphragm 36. However, the separation can also be effected by means of a movable, spring-supported piston.

The lower connecting line 28, which can for instance have a throttle, not shown, discharges into the lower valve chamber 32. Via the connecting line 28, the lower valve chamber 32 is subjected to the system pilot pressure, which is generated by the feed pump 11 and is corrected by the system pressure regulator 13.

The upper connecting line 29 discharges into the upper valve chamber 34 of the differential pressure valve 14. The flow pressure prevailing in the upper connecting line 29 and thus also in the upper valve chamber 34 is predetermined by the position of the control edge 22 and the thus-dictated throttling cross section 24.

The diaphragm 36 is connected, for instance by means of a tension or compression spring 38, to the housing of the differential pressure valve 14, so that the diaphragm 36 can react quickly and reversibly to changes in the pressure conditions.

The upper valve chamber 34 also has an outlet line 40, by way of which the liquid and gaseous media carried into the upper valve chamber 34 can be withdrawn in a metered quantity. The drain line 40 protrudes into the upper valve chamber 34 far enough that a second throttling cross section 39 is created between the inlet-side opening of the drain line 40 and the diaphragm 36. The size of this throttling cross section is automatically regulated in accordance with the magnitude of the system pilot pressure and of the flow pressure, the latter being dictated by the first throttling cross section 24. Pressure fluctuations in the lead line 16 and the drain line 40 are likewise automatically compensated for.

In FIG. 2, a second exemplary embodiment of the metering unit of the invention is shown. It includes a differential pressure valve 14', whose lower valve chamber 32' has a drain line 42, which includes a variable throttle 44 and by way of which the particular medium to be metered is returned to a supply tank. The lower connecting line 28' has a fixed throttle 43, by way of which the system pilot pressure is reduced. The drain line 42 permits varying the system pilot pressure applied to the lower valve chamber 32' and in this way makes it possible to vary the throttling cross section 39 of the differential pressure valve. This is necessary above all for the sake of fast adaptations of the volumetric flow, passing through the metering unit 10, to the dynamic load changes that occur in the fuel cell system, in the event that control by way of the position of the control piston is too sluggish. If a measurement of the volumetric flow is also performed inside the metering unit 10, then with the aid of this corrective device, the metering precision of the metering unit 10 can be increased considerably.

At first glance, combining a control piston 12 with a differential pressure valve 14 may appear complicated compared to a simple throttle device, but it offers major advantages. The system pilot pressure, generated by the feed pump 11 and corrected by the system pressure regulator 13, generally drops not only at a throttle device used for metering purposes but also at throttling components inside the line system. A linear change in the throttling cross section of a throttle device hence causes a nonlinear change in the flow pressure in the line system. Coupling two throttle devices (the control piston 12 and the differential pressure valve 14, 14'), whose throttling cross sections 24, 39 dictate one another, to make a metering unit 10 leads to a constant pressure drop at the metering unit 10, given a constant position of the control piston 12, and thus to a proportionality of the pressure drop and the first throttling cross section 24. Given a suitable design of the control edge 22, a proportionality is furthermore obtained between the piston stroke of the control piston 12 and the volumetric flow passing through the metering unit 10.

In FIG. 3, a fuel cell system 50 is schematically shown, in which the use of the metering unit of the invention will be explained as an example.

The generation of the hydrogen required for the fuel cell operation takes place directly in the fuel cell system 50, in a so-called reformer 51. The hydrogen is obtained by partial oxidation of fuels with the addition selectively of water vapor, air, or a mixture of the two. The reaction typically takes place in a heatable catalytic converter; as the fuels, gasoline, Diesel, methane or methanol can be used. Methanol and water mixtures, or emulsions of gasoline and water, are also suitable. All the educts are delivered in gaseous form to the reformer 51. A prerequisite is an evaporator for a fuel 53 and optionally also for water 52. The requisite energy can be furnished via a catalytic burner 54, for instance.

The gas flow leaving the reformer contains major quantities of CO, which would inactivate the catalysts contained in PEM fuel cells. For this reason, a plurality of chemical cleaning stages 55, 56 are integrated into the system between the reformer 51 and the fuel cells 62; with the addition of water, these stages convert the carbon monoxide into carbon dioxide and hydrogen. In addition, optional heat exchangers 57, 58 are provided downstream of the cleaning stages, in order to dissipate the reaction heat.

A metering of fuel by means of the metering unit of the invention is preferably effected in such a system between a fuel tank 59 and the evaporator 52 at a first point 101, or between the fuel tank 59 and the reformer 51 at a second point 102, and as needed between the fuel tank 59 and the catalytic burner 54 at a third point 103.

Provision is made for metering superpure water between a water tank 60 and the heat exchangers 57, 58 at a fourth point 104, between the water tank 60 and the fuel cells 62 at a fifth point 105, between the water tank 60 and the cleaning stages 55, 56 at a sixth point 106, and between the cleaning stage 55 and an evaporator 53 at a seventh point 107.

Depending on the method variant, an admixture of metered air may also be needed. This is done above all between a compressor 61 and the catalytic burner 54 at an eighth point 108, between the compressor 61 and the cleaning stage 56 at a ninth point 109, between the compressor 61 and the fuel cells 62 at a tenth point 110, and between the compressor 61 and a reformer 51 at a further point 111.

The metering unit of the invention is not limited to the exemplary embodiments described; on the contrary, further features of a metering unit with two coupled throttle devices are also conceivable. Moreover, the metering unit of the invention can be coupled with an atomizer, so that liquid educts can for instance be delivered in a metered quantity and in superfinely distributed form to the reformer.

We claim:

1. A metering unit for metering liquid and/or gaseous educts by means of a feed pump for a fuel cell system comprising:
   a housing,
   a differential pressure valve (14) located within said housing for regulating the educt flow and having a movable member defining an upper valve chamber (34) and a lower valve chamber (32),
   a lead line (16) having a piston portion (16a),
   at least one control piston (12) reciprocally movable within said piston portion (16a),
   a first and a second connecting line (28, 28',29) leading from the piston portion (16a) to the differential pressure valve (14, 14'),
   said differential pressure valve (14, 14') having a regulatable throttling cross section (39) which can be varied automatically, as a function of a flow pressure dictated by the position of the control piston within the piston portion (16a), in order to regulate the educt flow, and
   at least one drain line (40) protruding into said upper valve chamber far enough that said regulatable throttling cross section (39) is created between an inlet side opening of said drain line and said movable member,
   further comprising a travel sensor (20) for determining the position of the control piston (12) in the lead line (16).

2. A metering unit for metering liquid and/or gaseous educts by means of a feed pump for a fuel cell system comprising:
   a housing,
   a differential pressure valve (14) located within said housing for regulating the educt flow and having a movable member defining an upper valve chamber (34) and a lower valve chamber (32),
   a lead line (16) having a piston portion (16a),
   at least one control piston (12) reciprocally movable within said piston portion (16a),
   a first and a second connecting line (28, 28', 29) leading from the piston portion (16a) to the differential pressure valve (14, 14'),
   said differential pressure valve (14, 14') having a regulatable throttling cross section (39) which can be varied automatically, as a function of a flow pressure dictated by the position of the control piston within the piston portion (16a), in order to regulate the educt flow, and
   at least one drain line (40) protruding into said upper valve chamber far enough that said regulatable throttling cross section (39) is created between an inlet side opening of said drain line and said movable member,
   wherein at least one of the connecting lines (28, 28', 29) has a throttle (43).

3. The metering unit of claim 2, further comprising a proportional magnet (18) for varying the position of the control piston (12) in the lead line (16).

4. The metering unit of claim 3, wherein the control piston (12) has a control edge (22) whose position in the lead line (16) predetermines the size of a further regulatable throttling cross section (24) for regulating the educt flow.

5. The metering unit of claim 2, wherein the movable member comprises a movable, spring-supported piston, whose position predetermines the throttling cross section (39) of the differential pressure valve (14, 14'), for regulating the educt flow.

6. The metering unit of claim 5, wherein the lower valve chamber (32, 32') of the differential pressure valve (14, 14') is subjected to the liquid or gas pressure prevailing in the lead line (16), and the upper valve chamber (34) is subjected to the liquid or gas pressure that is reduced by the control piston (12).

7. The metering unit of claim 2, wherein the movable member comprises a movable diaphragm (36), whose deformation predetermines the throttling cross section (39) of the differential pressure valve (14, 14'), for regulating the educt flow.

8. The metering unit of claim 7, wherein the lower valve chamber (32, 32') of the differential pressure valve (14, 14') is subjected to the liquid or gas pressure prevailing in the lead line (16), and the upper valve chamber (34) is subjected to the liquid or gas pressure that is reduced by the control piston (12).

9. A metering unit for metering liquid and/or gaseous educts by means of a feed pump for a fuel cell system comprising
   at least one lead line (16) for delivering an educt flow,
   at least one control piston,
   a differential pressure valve for regulating the educt flow,
   the differential pressure valve having a regulatable throttling cross section which can be varied automatically, as a function of a flow pressure dictated by the control piston, in order to regulate the educt flow, and
   said lead line (16) leading to the control piston (12), and a first and a second connecting line (28, 28', 29) leading from the control piston (12) to the differential pressure valve (14, 14'),
   wherein the differential pressure valve (14, 14') comprises a movable, spring-supported piston or a diaphragm (36), whose position predetermines the throttling cross section (39) of the differential pressure valve (14, 14'), for regulating the educt flow,
   wherein the differential pressure valve (14, 14') comprises an upper valve chamber (34) and a lower valve chamber (32, 32'), which are separated from one another by the piston or the diaphragm (36), and
   wherein the lower valve chamber (32') has a drain line (42), and that the drain line (42) contains a further throttle (44).

10. The metering unit of claim 9, wherein the control piston (12) has a control edge (22) whose position in the lead line (16) predetermines the size of a further regulatable throttling cross section (24) for regulating the educt flow.

* * * * *

UNITED STATES PATENT AND TRADEMARK OFFICE
CERTIFICATE OF CORRECTION

PATENT NO. : 6,874,530 B2
DATED : April 5, 2005
INVENTOR(S) : Michael Nau et al.

It is certified that error appears in the above-identified patent and that said Letters Patent is hereby corrected as shown below:

Title page,
Item [54], Title, should read as follows:
-- [54] METERING UNIT AND METHOD FOR METERING LIQUID OR GASEOUS EDUCTS FOR A FUEL CELL SYSTEM --

Signed and Sealed this

Thirty-first Day of May, 2005

JON W. DUDAS
*Director of the United States Patent and Trademark Office*